United States Patent [19]
McCarty et al.

[11] Patent Number: 6,015,285
[45] Date of Patent: Jan. 18, 2000

[54] CATALYTIC COMBUSTION PROCESS

[75] Inventors: Jon G. McCarty, Portola Valley; Victor L. Wong, Daly City; Bernard J. Wood, Santa Clara, all of Calif.

[73] Assignee: Gas Research Institute, Chicago, Ill.

[21] Appl. No.: 09/016,835

[22] Filed: Jan. 30, 1998

[51] Int. Cl.⁷ .................................. B01J 8/02; B01J 23/44
[52] U.S. Cl. .............................. 431/7; 502/304; 502/303; 502/339; 502/340
[58] Field of Search .................... 431/7, 170, 326; 502/304, 303, 339, 340

[56] References Cited

U.S. PATENT DOCUMENTS

| | | | |
|---|---|---|---|
| 3,056,646 | 10/1962 | Cohn et al. | 431/7 |
| 4,714,632 | 12/1987 | Cabrera et al. | |
| 4,822,642 | 4/1989 | Cabrera et al. | |
| 5,183,401 | 2/1993 | Dalla Betta et al. | |
| 5,202,303 | 4/1993 | Retallick et al. | |
| 5,232,357 | 8/1993 | Dalla Betta et al. | |
| 5,248,251 | 9/1993 | Dalla Betta et al. | |
| 5,250,489 | 10/1993 | Dalla Betta et al. | |
| 5,258,349 | 11/1993 | Dalla Betta et al. | |
| 5,259,754 | 11/1993 | Dalla Betta et al. | |
| 5,281,128 | 1/1994 | Dalla Betta et al. | |
| 5,326,253 | 7/1994 | Dalla Betta et al. | |
| 5,405,260 | 4/1995 | Betta et al. | |
| 5,425,632 | 6/1995 | Kazunori et al. | |
| 5,466,651 | 11/1995 | Pfefferle | |
| 5,476,823 | 12/1995 | Beck et al. | |
| 5,509,798 | 4/1996 | Feeley et al. | 431/7 |
| 5,629,067 | 5/1997 | Kotani et al. | |
| 5,823,761 | 10/1998 | Euzen et al. | 431/7 |

FOREIGN PATENT DOCUMENTS

| | | |
|---|---|---|
| 283910 | 9/1988 | European Pat. Off. |
| 3922265 | 2/1990 | Germany |
| 63-51944 | 3/1988 | Japan |
| 4-197443 | 7/1992 | Japan |

OTHER PUBLICATIONS

J.P. Kesselring et al. (Acurex/Energy and Environmental Div.): *Design Criteria for Stationary Source Catalytic Combustion Systems*, Report to the Environmental Protection Agency, EPA–600/7–79–181, Aug. 1979.

D.L. Trimm: Catalytic Combustion (Review), *Applied Catalysis*, 7, (1983), pp. 249–282.

H. Arai and H. Machida: Recent Progress in High–Temperature Catalytic Combustion, *Catalysis Today*, 10 (1991) pp. 81–95.

Hiromichi Arai, et al.: Research and development on high temperature catalytic combustion, *Catalysis Today*, Vol. 26 (1995), pp. 217–221.

J.P. Kesselring: Catalytic Combustion, *Advanced Combustion Methods*, F.J. Weinberg, ed., Academic Press, 1986, Chapter 4, pp. 237–275.

(List continued on next page.)

*Primary Examiner*—Ira S. Lazarus
*Assistant Examiner*—Sara Clarke
*Attorney, Agent, or Firm*—Pauley Petersen Kinne & Fejer

[57] ABSTRACT

A process for combustion of fuel in which oxygen-containing gas is mixed with a fuel to form a combustible mixture which is then contacted in a first zone with a first zone combustion catalyst comprising PdO disposed on a support at reaction conditions sufficient to combust a portion of the fuel and produce a first zone combustion catalyst temperature no greater than about 800° C. The partially combusted fuel from the first zone is then contacted in a second zone with a second zone combustion catalyst. Supports for the first zone combustion catalyst include $La_2O_3$-stabilized $\gamma$-$Al_2O_3$, La-stabilized $\gamma$-$Al_2O_3$, Ce-stabilized $\gamma$-$Al_2O_3$, Ba-stabilized $\gamma$-$Al_2O_3$, and $La_2O_3$-$11Al_2O_3$ hexaaluminate. Second zone combustion catalysts include $La_{0.5}Sr_{0.5}MnAl_{11}O_{19}$, PdO on $La_2O_3$-$11Al_2O_3$ hexaaluminate, and $La_{0.2}Sr_{0.8}MnAl_{11}O_{19}$.

13 Claims, 2 Drawing Sheets

FIG.1a

OTHER PUBLICATIONS

Robert J. Farrauto, et al.: Catalytic Combustion for Ultra–Low Emissions, *Materials Research Society Symposium Proceedings,* Materials Research Society, vol. 344 (1994), pp. 101–120.

Ralph A. Dalla Betta, et al.: Catalytic combustion technology to achieve ultra low $NO_x$ emissions: Catalyst design and performance characteristics, *Catalysis Today,* vol. 26 (1995), pp. 329–335.

H. Sadamori, et al.: Development of a high–temperature combustion catalyst system and prototype catalytic combustor turbine test results, *Catalysis Today,* vol. 26 (1995), pp. 337–344.

Tomiak Furuya, et al.: Development of a hybrid catalytic combustor for a 1300°C. class gas turbine, *Catalysis Today,* vol. 26 (1995), pp. 345–350.

Yasushi Ozawa, et al.: Development of a low $No_x$ catalytic combustor for a gas turbine, *Catalysis Today,* vol. 26 (1995), pp. 351–357.

Marcus F. M. Zwinkels et al.: Catalytic Materials for High–Temperature Combustion, *Catal. Rev.—Sci. Eng.,* 35(3), pp. 319–358, 1993.

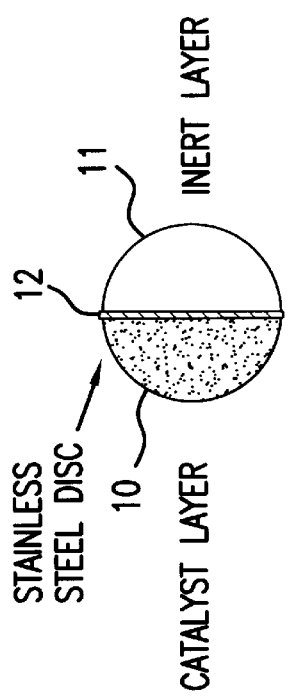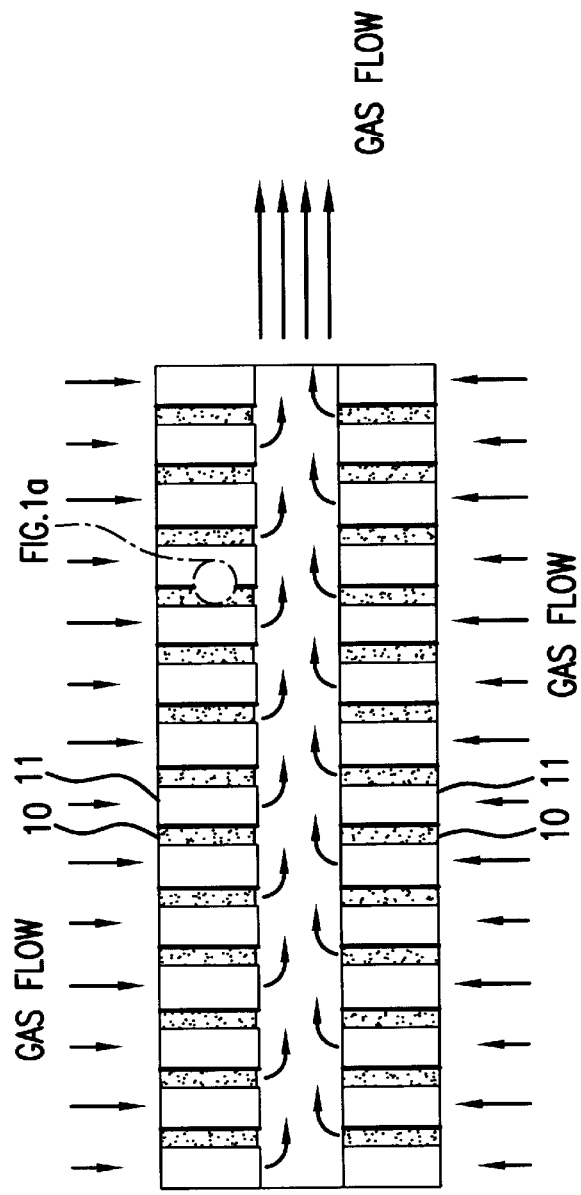

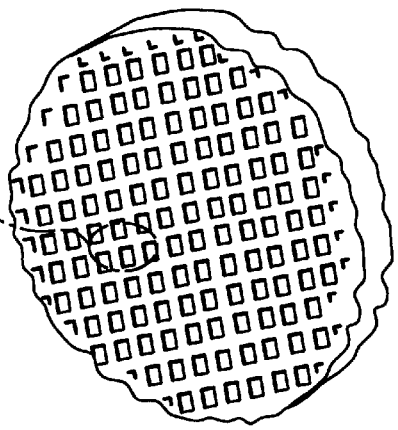
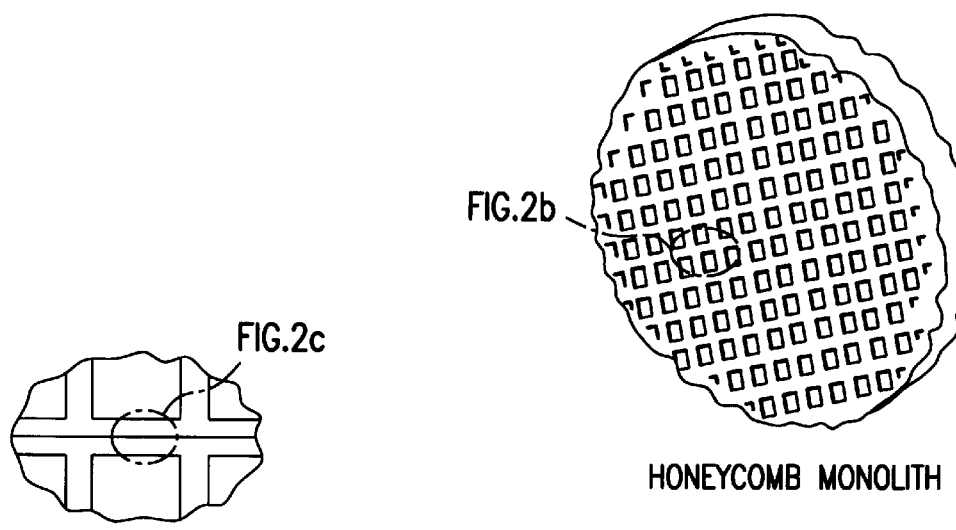
HONEYCOMB MONOLITH
FIG.2a
MONOLITH WEB
FIG.2b
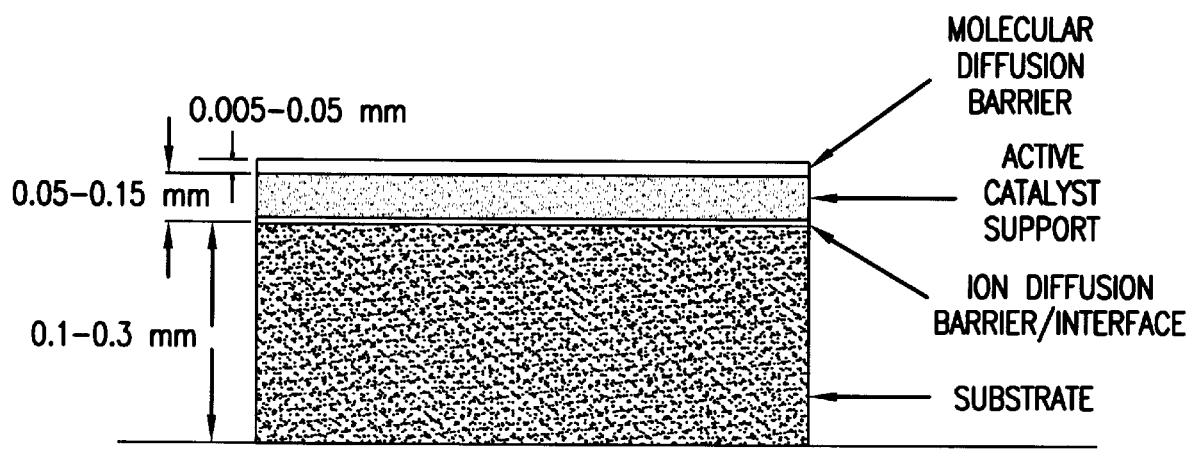
FIG.2c

CATALYTIC COMBUSTION PROCESS

BACKGROUND OF THE INVENTION

1. Field of the Invention

This invention relates to catalytic combustion of a fuel, in particular, a process for catalytic combustion of natural gas.

Catalytic combustion, while a mature technology for a volatile organic compound incineration and gasoline or heavy fuels, has not been commercially developed for utilization of natural gas. Catalytic combustion is also the only combustion technology capable of producing nitrogen oxide emissions consistently below 10-ppm levels during the lean combustion of natural gas in small (1–5 MW) gas turbine engines. Several aspects of the process of catalytic combustion make the development of durable, high-temperature catalysts difficult for natural gas fuel. Firstly, the rate of diffusional convection of methane is comparable to the rate of convection cooling and, thus, the surface temperatures of an active catalyst can approach adiabatic temperatures. Secondly, there are no catalytic and substrate materials currently available that can long withstand the adiabatic temperatures required for efficient operation of gas turbines (typically greater than 1200° C.). Finally, methane is the most difficult fuel to combust with a catalyst, and very active materials such as palladium oxide (PdO) must be used to sustain combustion under the desired fully premixed inlet conditions. Consequently, some methods for moderating catalyst wall temperatures during the early stages of premixed lean catalytic combustion are required so that the active catalysts have a long lifetime.

The catalytic combustion process and specific catalytic combustor configurations described herein take advantage of several concepts for preventing the overheating of catalysts during the catalytic combustion of natural gas. Each of these concepts are used and combined as stages in several combustor configurations. Specific catalytic materials and substrate materials are identified and described that are suitable for use in such catalytic combustors.

2. Description of Prior Art

Currently, advanced commercial combustors that are designed for low $NO_x$ emissions are lean, premixed (also known as dry low $NO_x$) burners. A cluster of fuel nozzles are typically arranged in an annular pattern. They alternately fluctuate the fuel/air ratio to stabilize the flame while maintaining extremely lean conditions. Conventional burners use hotter flames (1800° C.) with a large amount of secondary air mixed in downstream to lower the temperature to target levels. Such burners produce unacceptable $NO_x$ levels (50 ppm). The lean premixed burners currently available use a much lower amount of secondary air and can achieve lower $NO_x$ levels (about 10 ppm).

Catalytic combustors also use premixed fuel and air with or without an upstream flame preheater, and with or without downstream secondary air, depending upon inlet temperature, air throughput, and targeted outlet temperatures. The fuel and oxygen react on the surfaces of catalytically-active components which are dispersed over a high surface area to volume monolithic substrate structure. One or more monoliths are used in series to tailor component material properties with mean catalyst temperatures.

There are a number of reviews and published papers on the selection and use of catalytic combustion materials. See (1) *Design Criteria for Stationary Source Catalytic Combustion Systems,* J. P. Kesselring, Acurex/Energy and Environmental Division, Report to the Environmental Protection Agency EPA-600/7-79-181 (August 1979); (2) *Applied Catalysis* 7, D. L. Trimm, Catalytic Combustion (Review), (1983), pp. 249–82; (3) *Recent Progress in High Temperature Catalytic Combustion,* H. Arai and H. Machida, Catalysis Today, 10 (1991) pp. 81–95; (4) *Catalytic Materials for High-Temperature Combustion,* Marcus F. M. Zwinkels, et al., Catalysis Review—Science and Engineering, Vol. 35(3), pp. 319–358 (1993); (5) *Research and Development on High Temperature Catalytic Combustion,* Hiromichi Arai, et al, Catalysis Today, Vol. 26, pp. 217–221 (1995); (6) *Catalysis in Combustion, Advanced Combustion Methods,* J. P. Kesselring, F. J. Weinberg, ed., Chpt. 4, pp. 237–75 (Academic Press, 1986); (7) *Catalytic Combustion for Ultra-Low Emissions,* Robert J. Farrauto, et al., Materials Research Society Symposium, Materials Research Society, Vol. 344, pp. 101–120 (1994). In addition, several recent articles describe specific attempts to develop combustion catalysts from natural gas. See (1) *Catalytic Combustion Technology to Achieve Ultra Low $NO_x$ Emissions: Catalyst Design and Performance Characteristics,* Ralph A. Dalla Betta, et al, Catalysis Today, Vol. 26, pp. 329–335 (1995); (2) *Development of a High-Temperature Combustion Catalyst System and Prototype Catalytic Combustor Turbine Test Results,* H. Sadamori, et al., Catalysis Today, Vol. 26, pp. 337–344 (1995); (3) *Development of a Hybrid Catalytic Combustor for a 1300° C. Class Gas Turbine,* Tomiak Furuya, et al., Catalysis Today, Vol. 26, pp. 345–350 (1995); (4) *Development of a Low $NO_x$ Catalytic Combustor for a Gas Turbine,* Yasushi Ozawa, et al., Catalysis Today, Vol. 26, pp. 351–357 (1995).

As previously stated, the primary technical problem associated with catalytic combustion of natural gas is the high diffusivity of methane in the premixed fuel and air stream which causes the reaction rate at the catalyst surface to match the rate of heat dissipation by conduction to the premixed gas in such a way that surface temperatures approach the adiabatic temperature. One solution to this problem is the use of a diffusion barrier layer (DBL) at least partially covering the catalyst, thereby placing a restriction on the rate of convective diffusion of natural gas fuel components to the hot, active catalyst surface while simultaneously not impeding the rate of cooling. This method also has the potential for lowering catalyst wall temperatures to tolerable levels. See, for example, U.S. Pat. No. 5,405,260 which teaches the use of one or more coatings of a refractory oxide as a diffusion barrier to prevent temperature "runaway" in catalytic combustion systems. See also U.S. Pat. No. 5,326,253 and U.S. Pat. No. 5,425,632, both of which teach the use of diffusion barrier layers for controlling the temperature of the catalyst. U.S. Pat. No. 5,202,303 and U.S. Pat. No. 5,183,401 teach monolithic combustion catalysts that also provide a measured temperature rise combustion.

In another known method for moderating catalyst temperature, premixed air and gas radially flow through alternate layers of catalytically-active and non-catalytic granulated beds. This design allows the alternating passive beds to cool the active beds while it limits the maximum temperature rise through the entire catalyst segment.

SUMMARY OF THE INVENTION

Catalytic combustion of natural gas for gas turbines has been shown to produce NO and $NO_2$ at levels well below 10 ppm. Nevertheless, commercially-proven, durable, high temperature catalytic combustion devices for natural gas fuels do not yet exist. Accordingly, it is one object of this invention to provide a viable method for catalytic combustion of natural gas.

It is another object of this invention to provide a catalytic system suitable for combustion of natural gas.

It is another object of this invention to provide a catalytic combustion system capable of sustaining complete natural gas combustion, that is greater than 99% $CH_4$ conversion, with inlet (premixed) gas temperatures below about 400° C.

It is another object of this invention to provide a catalytic combustion system capable of enduring regular fill power to standby (turndown) cycles, regular startup and shutdown cycles, and multiple rapid full power to cold shutdown transitions over extended operation without mechanical failure.

It is yet another object of this invention to provide a catalytic combustion system whereby the catalyst is able to sustain minimal activity with adiabatic temperatures exceeding 1200° C.

These and other objects of this invention are achieved by a process for combustion of a fuel comprising the steps of mixing an oxygen-containing gas with a fuel to form a combustible mixture, contacting the combustible mixture in a first zone with a first zone combustion catalyst at reaction conditions sufficient to combust a portion of the fuel and produce a first zone combustion catalyst temperature no greater than about 800° C., and contacting the partially combusted fuel from the first zone in a second zone with a second zone combustion catalyst. The first zone combustion catalyst comprises palladium oxide dispersed on a support selected from the group consisting of $La_2O_3$-stabilized $\gamma$-$Al_2O_3$, La-stabilized $\gamma$-$Al_2O_3$, Ce-stabilized $\gamma$-$Al_2O_3$, Ba-stabilized $\gamma$-$Al_2O_3$, and $La_2O_3$ hexa-aluminate. The second zone combustion catalyst is selected from the group consisting of $La_{0.5}Sr_{0.5}MnAl_{11}O_{19}$, PdO on $La_2O_{3.11}Al_2O_3$ hexa-aluminate, and $La_{0.2}Sr_{0.8}MnAl_{11}O_{19}$ with Pt.

BRIEF DESCRIPTION OF THE DRAWINGS

These and other objects and features of this invention will be better understood from the following detailed description taken in conjunction with the drawings wherein:

FIG. 1 is a diagram showing a combustion catalyst configuration comprising alternate layers of catalytic and inert granules in an inward radial flow configuration suitable for use in the process of this invention; and FIGS. 2a, 2b and 2c show a multi-layered, washcoated combustion catalyst monolith suitable for use in the process of this invention.

DESCRIPTION OF PREFERRED EMBODIMENTS

The primary technical difficulty associated with catalytic combustion of natural gas is the need to maintain high activity, most readily accomplished through low catalyst temperatures, while simultaneously providing for rapid heat transfer. Because heat and mass transfer in low pressure drop monolithic devices are coupled, high heat transfer generally implies high mass transfer rates. The more refractory nature of natural gas and the high mass diffusivity of methane relative to other fuels tend to lead to two stable points of operation of the catalyst regardless of its position in the combustor: (1) kinetically controlled regimes with catalyst temperatures very near the gas inlet temperature, and (2) mass transfer controlled rates where the catalytic wall temperature approaches adiabatic temperatures. The adiabatic temperature for gas turbines is generally very high, typically greater than 1200° C. Operation of an active catalyst at such temperatures leads to significant sintering, if not evaporation or attrition by migration, and reaction of the active components with supporting (dispersing) oxides and substrate materials. Loss of activity by overheating soon leads to a situation in which the deactivating catalyst cools to lower temperatures until finally the lower extinction point is reached and the catalyst can no longer generate sufficient heat to overcome convection cooling along the wall. At this point, the catalyst becomes inoperable. Robust catalyst materials, that is, catalyst materials having the ability to withstand brief (about 10 seconds) and repeated exposures to temperatures of about 1200° C., generally do not have sufficient activity to sustain combustion rates when exposed to unheated combustion mixtures, and highly active catalysts cannot sustain their activity at mass transport-controlled surface temperatures.

Catalytic combustion technology developed over 25 years ago may be considered technically successful when applied to light and medium hydrocarbon fuels. Catalytic combustion of higher hydrocarbons is not currently in commercial use, not because of poor durability or high emissions levels, but because the lower flammability of these fuels allows lean burner operation with acceptable $NO_x$ emissions, and because peak shaving and cogeneration with clean burning light hydrocarbon fuels is not currently economical relative to natural gas. In addition, these fuels have much lower ignition points and lower effective activation energies for catalytic or homogeneous combustion relative to methane. Thus, compressed air temperatures are sufficient to ignite combustion with only moderately active catalysts and their low mass diffusivity relative to thermal diffusivity means that the catalyst wall temperatures can run well below adiabatic. By comparison, successful combustion catalysts specifically for natural gas require extraordinary methods, which are not necessary with heavier fuels, to avoid overheating and degrading the catalyst.

This invention involves the construction of multi-layered catalyst overlayers that are mechanically, thermally and chemically compatible with the substrate, and that can be fabricated with commercially available materials and methods. Table 1 shows a list of desirable properties of catalyst components and listing of suitable materials (not linked to the adjacent listing of properties).

TABLE 1

KEY PROPERTIES OF HIGH-TEMPERATURE
NATURAL GAS COMBUSTION
CATALYST COMPONENT MATERIALS

| Application: Desired Property | Candidate Materials |
|---|---|
| Substrate: | |
| High melting point | Fe—Cr—Al metal alloys; |
| Low thermal expansion coefficient | $3Al_2O_3.2SiO_2$ (mullite); |
| Isotropic thermal expansion coefficient | $ZrO_2$- and $Al_2O_3$- reinforced mullite |
| Low elastic modulus | composites; |

TABLE 1-continued

KEY PROPERTIES OF HIGH-TEMPERATURE
NATURAL GAS COMBUSTION
CATALYST COMPONENT MATERIALS

| Application: Desired Property | Candidate Materials |
|---|---|
| High thermal conductivity | $NaZr_2P_3O_{12}$ (NZP); |
| High fracture strength | $2MgO.2Al_2O_3.5SiO_2$ (cordierite); |
| No phase transitions | $Al_2O_3.TiO_2$; |
| Low porosity | $ZrO_2$ (Mg-, Y-phase stabilized zirconia); |
| Low cation mobility | $SiO_2$ (fused quartz); |
| Low oxide ion mobility | $SiO_2/SiC$ (silica-coated silicon carbide) |
| Support: | |
| Low reactivity with substrate interface | $La_2O_3.11Al_2O_3$ (La hexa-aluminate); |
| Highly stable specific surface area | $BaO.6Al_2O_3$ (Ba hexa-aluminate); |
| Low volatility | La- or Ca-stabilized $\gamma$-$Al_2O_3$; |
| High melting point | $LaAlO_3$, $SrZrO_3$ (perovskites); |
| Expansion coefficient matches substrate | $MgAl_2O_4$ (spinel) |
| Catalytic Phase: | |
| High specific combustion activity | PdO, Pt, Rh (noble metals); |
| Low reactivity with support | $Co_2O_3/LaAlO_3$; $Mn_2O_3/LaAlO_3$; |
| Good adhesion with support | $La_{1-x}Sr_xFeO_3$; |
| Low volatility | $La_{.2}Sr_{.8}MnAl_{11}O_{19}$; (Arai catalyst) |
| Diffusion Barrier: | |
| Low specific combustion activity | $La_2O_3.11Al_2O_3$, $BaO.6Al_2O_3$; |
| Highly stable specific surface area | Mg-, Y-stabilized $ZrO_2$; |
| High infrared emissivity | $SrZrO_3$; $MgAl_2O_4$ |
| High thermal conductivity | $\alpha$-$Al_2O_3$ |

The process for combustion of a fuel in accordance with this invention comprises the steps of mixing an oxygen-containing gas with a fuel to form a combustible mixture, contacting the combustible mixture in a first zone with a first zone combustion catalyst comprising PdO dispersed as small particles within a porous supporting oxide at reaction conditions sufficient to combust a portion of the fuel and produce a first zone combustion catalyst temperature no greater than about 800° C., and contacting the partially combusted fuel from the first zone in a second zone with a second zone combustion catalyst. The primary use for the process of this invention is in low $NO_x$ burners for application in high temperature gas turbine engines. The overall configuration for such catalytic combustors used as natural gas burners is that of multi-stage sequential conversion of fully premixed natural gas and compressed air. The process of this invention requires at least two stages, although up to five stages may be utilized in catalytic combustors with significantly improved performance compared to current catalytic combustors. In accordance with a particularly preferred embodiment of the method of this invention, three combustion stages are employed in the process of this invention.

Several alternative types of initial stage, main stage, third stage, and sequential stage catalysts are possible in accordance with this invention. Several configurations for each stage are described hereinbelow.

Initial-Stage Catalysts

Several types of precombustion, or initial stage combustion, catalysts are suitable for use in the process of this invention. One consists of an alternate-layer, granulated-bed, radial-flow device as shown in FIG. 1 comprising alternating layers of catalyst 10 and inert material 11 separated by stainless steel disks 12. A second type of catalyst suitable for use as an initial-stage catalyst is a diffusion barrier layer-coated monolithic catalyst. Several other possible combinations of materials are shown in Table 2.

TABLE 2

CATALYST CONFIGURATIONS AND MATERIALS

| Segment | Substrate | Active Catalyst | Catalyst Support | Material DBL |
|---|---|---|---|---|
| Precombustion catalyst 1 | Alternate-layer stainless-steel and inconel-contained granules with radial flow configuration | 5 wt % PdO | $La_2O_3$-stabilized $\gamma$-$Al_2O_3$ | None inert layer, $\alpha$-$Al_2O_3$ |
| Precombustion catalyst 2 | Alternate-layer stainless-steel and inconel-contained granules with radial flow configuration | 5 wt % PdO | $La_2O_3$-stabilized $\gamma$-$Al_2O_3$ | None inert layer, $\gamma$-$Al_2O_3$ |

TABLE 2-continued

CATALYST CONFIGURATIONS AND MATERIALS

| Segment | Substrate | Active Catalyst | Catalyst Support | Material DBL |
|---|---|---|---|---|
| Precombustion catalyst 3 | Metal alloy foil honeycomb (200 cells/in$^2$) with single-side catalyst coating | PdO (wt % loading unknown) | (La-, Ce-, or Ba-) stabilized $\gamma$-Al$_2$O$_3$ | None |
| Alternative precombustion catalyst monolith | Zirconia reinforced mullite composite foam ($\approx$25 ppi) with radial flow configuration | 3 wt % PdO | La$_2$O$_3$.11Al$_2$O$_3$ hexa-aluminate | $\alpha$-Al$_2$O$_3$ |
| Main combustion monolith 1 | Zirconia-reinforced mullite composite honeycomb (200 cells/in$^2$) | LaSrMnAl$_{11}$O$_{19}$ with 5 wt % Pt to 1.0 cm | None | YZP Coatings Al $\alpha$-alumina paint |
| Second combustion monolith 2 | Zirconia-reinforced mullite composite honeycomb (200 cells/in$^2$) | 5 wt % PdO | La$_2$O$_3$.11Al$_2$O$_3$ hexa-aluminate | La$_2$O$_3$.11 Al$_2$O$_3$ hexa aluminate |
| Main combustion monolith 3 | Zirconia reinforced mullite composite honeycomb (200 cells/in$^2$) | 5 wt % PdO | La$_2$O$_3$.11Al$_2$O$_3$ hexa-aluminate | La$_2$O$_3$.11 Al$_2$O$_3$ hexa-aluminate |
| Final combustion monolith 1 | Zirconia-reinforced mullite composite honeycomb (400 cells/in$^2$) | La$_{.2}$Sr$_{.8}$MnAl$_{11}$O$_{19}$ | None | None |
| Final combustion monolith 2 | Zirconia-reinforced mullite composite honeycomb (400 cells/in$^2$) | La$_{.2}$Sr$_{.8}$MnAl$_{11}$O$_{19}$ | None | None |
| Final combustion monolith 3 | Zirconia-reinforced mullite composite honeycomb (400 cells/in$^2$) | La$_{.2}$Sr$_{.8}$MnAl$_{11}$O$_{19}$ | None | None |

Each of these initial-stage catalysts can be fabricated in such a way so as to actively convert natural gas at inlet temperatures as low as 350° C. and limit the outlet temperatures for the precombustion catalyst to temperatures that range between 150° C. and 600° C. temperature rise. All of the specific precombustion or first-stage catalysts suitable for use in this invention utilize highly active, sintering-resistant, low-volatility palladium-oxide catalysts, although highly dispersed platinum catalysts could be used as well. They differ in the monolithic substrates, and in the selection and application of supporting materials. In general, catalysts where the maximum temperature conceivable for the catalyst falls below 1100° C. may utilize stabilized $\gamma$-alumina supports. Stabilized $\gamma$-alumina catalysts have the advantage of utilizing very high surface area bimodal porous material and highly dispersed catalysts for catalytic phase dispersion and for maximum reaction rate. These support materials must be bimodal in their structure, containing both microporous volumes and large amounts of macropores. Such supports are often very weak, fragile materials, but as long as the substrate can bond the supporting materials, there should not be a problem of adhesion. High thermal expansion differences between such highly porous supports and their substrate is not a severe problem as long as the support layer thickness is less than about 100 microns.

Alternative catalysts for which temperatures at the catalytic wall could exceed 1200° C. are the hexa-aluminates of lanthanum (La) and barium (Ba). These supports, with surface areas approaching 50 m$^2$/g in a bimodal (micro, <1 nm, and meso, <10 nm) distribution of pore sizes are the most stable sintering-resistant supports now available. They can be washcoated on the substrates, or they can be prepared in a granulated form. These supports, when precalcined before washcoating, can tolerate brief temperature excursions up to 1500° C. without significantly decreasing area and, thus, represent highly robust materials.

For DBL-coated catalysts, a second layer is applied over the catalytic layer. Appropriate materials for the DBL coatings include sintered alpha alumina ($\alpha$-Al$_2$O$_3$) powders, commercial $\alpha$-Al$_2$O$_3$ platelets, zirconia powders, and titania powders. These and other compounds with low volatility and low reactivity toward the active components of the catalyst (for example PdO) or the supporting materials, may also be used. A characteristic feature of the diffusion barrier layer is low macroporous (>100 nm) volume, ideally less than about 0.1 cm$^3$/cm$^3$, in a stable, pre-sintered condition so that the diffusivity of gases through this layer is well defined and stable over extended periods of normal operation.

Substrate materials suitable for use with catalysts utilized in the process of this invention include commercially available FeCrAl alloy and NiCrAl alloy metal foils. More robust materials include silicon-coated silicon carbide having a melting point exceeding 1600° C., and thermal shock-resistant, composite mullite ceramics.

For catalytic combusters in which temperatures do not exceed 1200° C., the metal alloys could be used. For example, stabilized $\gamma$-alumina supported materials may be utilized with the high temperature metal alloys in the alternate-layer concept shown in FIG. 1 with precise fuel/air ratio control and a high degree of mixedness.

For more robust fabrications of the alternate-layer approach, silicon-coated silicon carbide plates and foams may be used along with hexa-aluminate granules to provide a catalyst that can survive repeated brief (seconds) excursions to temperatures as high as 1500° C. This combination of materials constitutes a robust design for the initial stage catalyst.

EXAMPLE 1

Configurations 1 and 2 for the initial-stage catalyst as shown in Table 2 used the alternate-layer radial flow catalyst assembly of FIG. 1. For the active catalyst bed, we crushed and sieved (8/12 mesh) Norton SA6576 ⅛-inch $\gamma$-alumina raschig ring catalyst pellets to about 1.24 millimeter granules. These particles were then stabilized with 5% by weight lanthania by impregnation with aqueous $La(NO_3)_3 \cdot 6H_2O$ followed by calcination in air at about 1000° C. 2.1% by weight Pd was then added to the stabilized γ-alumina granules by impregnation with aqueous $Pd(NO_3)_2$, drying, and activation in air at 900° C. for one hour. The resulting catalyst particles were stacked inside a concentric cylindrical inconel wire mesh basket in a layered fashion. In one configuration, the active catalyst layer was sandwiched between high density Norton ⅛-inch α-alumina granules, separated by stainless steel disks. In the second configuration, the active catalyst was sandwiched between layers of crushed and sieved Norton SA 6576 γ-alumina particles having the same size as the active catalyst. The alumina-based catalyst particles have a bimodal pore size distribution (8.5 nm micropores and 0.4 micron macropores at 0.18 $cm^3/g$). Radial flow (50-millimeter OD and 25-millimeter ID) is used to maintain the pressure drop below 0.1 atmospheres (and superficial inlet linear velocities below 2 m/s at actual pressure and temperature).

The design calls for a maximum temperature rise of 33% of the adiabatic temperature with 100% fuel conversion in the catalytically active layer. Heat transfer calculations show about 300° C. maximum temperature difference between the hot catalytic and cool non-catalytic layers. The target outlet temperature of the first zone is 650° C. to 750° C., depending on the target adiabatic temperature (1250° C. to 1400° C.) and the inlet temperature (350° C. to 400° C.). The large volume of catalysts used and the controlled catalyst temperature levels ensure an extended active life for this segment. This design approach is quite flexible and can be adapted in various geometric configurations (radial flow, cross flow, etc.) to give a range of outlet temperatures for the low inlet temperature, high throughput stages of 1-atmosphere and 10 to 15-atmosphere combustors.

EXAMPLE 2

The inlet segment of an alternative configuration is a DBL-coated $Pd/LaAl_{11}O_{18}$ TZM® composite (zirconia-reinforced mullite) ceramic foam. The foam was in the form of a 50 mm OD by 25 mm ID by 152 mm length cylinder with radial flow. The foam was first washcoated with 5% by weight La stabilized γ-alumina and calcined to 1150° C. for eight hours. The coating was still very thin, thus a second layer of washcoat was deposited and the monolith was calcined to 1150° C. for eight hours. Next the foam was impregnated with 5% by weight Pd, based on washcoat, by means of aqueous $Pd(NO_3)_2$. The coated foam monolith was then contained by Inconel 625™ alloy wire screens.

Downstream Segments

Second Stage

The combustor utilized in accordance with one embodiment of the process of this invention includes critical second and third segments. In these segments, monolith wall temperatures must be higher and catalyst durability is much more important than specific catalytic activity. DBL overcoatings are used to restrict the flux of reactant gases to the active layer. When matched to the turbulent boundary layer mass transfer coefficient, the DBL allows a cooling rate twice the rate of heat release, thereby lowering wall temperatures to values halfway between the local mean gas temperature and the adiabatic temperature. Specific material selections and monolith configurations are listed in Table 2.

All of the second-stage catalysts, as shown in Table 2, utilize honeycomb monoliths of $ZrO_2$-reinforced reaction-sintered mullite composite ceramics because the radial flow concept employed in the initial combustion stage is not likely to work for the main stage/second stage combustion at the lower velocities required for low pressure drop. Flashback of homogeneous combustion into the catalytic material could occur and therefore engulf the catalyst in adiabatic temperature gases. Thus, hot stage honeycombs must be composed of ceramic materials to avoid the likely possibility that second-stage monoliths would be encompassed in flame several times during the life of the catalyst.

An alternative substrate material suitable for use in the process of this invention is a low thermal expansion NZP class (sodium zirconium phosphate) barium zirconium phosphate. Suitable supporting materials which can maintain surface areas at the high temperatures of the downstream stages include hexa-aluminates, either as supports for PdO, if the wall temperatures are not likely to exceed 1200° C. over the life of the catalyst, or a self-supporting catalyst such as iron-ore manganese-doped hexa-aluminates available from Catalysts and Chemicals Far East, Ltd.

In accordance with one embodiment of this invention, the initial inlet zone of the hot-stage catalyst is treated with a noble metal to enhance the activity at the coldest portion of the main-stage combustor. In one of our tested configurations, the first centimeter of the hot-stage catalyst was doped with Pt, although Pd may also be used.

Finally, all main-stage combustors must have some diffusion barrier layer coating in order to prevent overheating of the walls. Wall overheating, that is temperatures exceeding 1200° C., lead to two severe problems: (1) an accelerated loss of the catalytically active components and an accelerated sintering of the supporting material, if any; and (2) high temperatures which invite the propagation of homogeneous reactions near the wall into the gas phase which, in turn, can lead to the flashback of homogeneous combustion into the monolith. For this reason, an active method of moderating wall temperature, such as the use of diffusion barrier layer coatings, is required to avoid this problem. The diffusion barrier layer itself must have very low specific catalytic activity for combustion, and the hexa-aluminate supports with significant amounts of basic oxide components are preferred over materials such as alumina. In accordance with one embodiment of this invention, pre-sintered hexa-aluminates were used to provide the diffusion barrier layer coating (Example 4 hereinbelow).

FIGS. 2a, 2b and 2c show a honeycomb monolith 30 comprising a substrate, 31, an active catalyst support 32, and a molecular diffusion barrier 33 in accordance with one embodiment of this invention. A suitable thin (10–50 μm) layer of calcined partially sintered, refractory oxide with well-defined pore size and low porosity acts as a mass transfer barrier that slows the reaction rate and limits the thermal rise of the wall to a fraction of the adiabatic temperature rise as discussed above. The thicker layer of active catalyst just below the barrier layer drives the combustion reaction. The barrier works by limiting mass transport of reactant methane or oxygen to the catalyst. It places an upper limit on the local reaction rate but does not significantly decrease the important "kinetically controlled" rates at lower temperature.

EXAMPLE 3

The second segment, or zone, of the combustor used 3.2 $mn^2$/cell, that is 200 cells per square inch, TZM composite honeycombs, with washcoated, DBL-protected catalysts. FIGS. 2a, 2b and 2c show this configuration. The catalyst was an approximately 330 micron layer of washcoated $Sr_{0.8}La_{0.2}MnAl_{11}O_{19}$ powder (3% by weight) on the ceramic honeycomb walls. The entry zone of the turbulent flow channel, the first 10 millimeters of the inlet portion of this segment of the combustor, was activated with Pt by applying a salt solution to the dry supporting washcoat, about 5% by weight Pt relative to the washcoat. Finally, a dense layer of $\alpha$-$Al_2O_3$ (type Al supplied by ZYP Coatings, Inc., of Oak Ridge, Tenn.) was deposited over the top of the catalyst layer as the DBL.

EXAMPLE 4

2 inch OD×2 inch length 200 cells/in$^2$ monoliths were initially washcoated with $LaAl_{11}O_{19}$ support. Active PdO was then impregnated into the support. Finally, to protect the Pd catalyst from sintering during sustained operations at high temperature and pressure, a diffusion barrier layer (DBL), consisting of 5% by weight of the La hexa-aluminate, was coated over the catalyst layer. The $LaAl_{11}O_{18}$ (hexa-aluminate) washcoat (approximately 50 microns) was used as the DBL.

Third Stage

The third stage of all configurations used 1.61-mm$^2$/cell (or 400 cells per square inch) TZM ceramic honeycombs with an approximately 20-micron washcoated Mn-substituted hexa-aluminate catalyst powder without a DBL coating.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A process for combustion of a fuel comprising the steps of:

mixing an oxygen-containing gas with a fuel to form a combustible mixture;

contacting the combustible mixture in a first zone with a first zone combustion catalyst comprising PdO disposed on a support selected from the group consisting of $La_2O_3$-stabilized $\gamma$-$Al_2O_3$, La-stabilized $\gamma$-$Al_2O_3$, Ce-stabilized $\gamma$-$Al_2O_3$, Ba-stabilized $\gamma$-$Al_2O_3$, and $La_2O_3$ hexa-aluminate at reaction conditions sufficient to combust a portion of said fuel and produce a first zone combustion catalyst temperature no greater than about 800° C., said first zone combustion catalyst being coated by a diffusion barrier layer selected from the group consisting of $\alpha$-$Al_2O_3$ and $La_2O_3$-$11Al_2O_3$ hexa-aluminate; and contacting the partially combusted fuel from the first zone in a second zone with a second zone combustion catalyst selected from the group consisting of $La_{0.5}Sr_{0.5}MnAl_{11}O_{19}$, PdO on $La_2O_3.11Al_2O_3$ hexa-aluminate, and $La_{0.2}Sr_{0.8}MnAl_{11}O_{19}$.

2. A process in accordance with claim 1, wherein said fuel is natural gas.

3. A process in accordance with claim 1, wherein said first zone combustion catalyst is disposed in a packed bed configured for radial flow comprising alternating beds of granular catalysts and granular noncatalytic ceramic materials separated by Inconel and stainless steel.

4. A process in accordance with claim 1, wherein said first combustion zone catalyst is disposed on one side of a wall of a metal alloy foil honeycomb substrate.

5. A process in accordance with claim 1, wherein said first zone combustion catalyst is disposed on a Zr-reinforced mullite composite foam substrate having a radial flow configuration.

6. A process in accordance with claim 1, wherein said first zone combustion catalyst is disposed on a Zr-reinforced mullite composite honeycomb substrate.

7. A process in accordance with claim 1, wherein said first zone combustion catalyst is disposed on a substrate comprising robust alternate layers of SiC plates and SiC foam-confined granules, said substrate configured for radial flow.

8. A process in accordance with claim 1, wherein said second zone combustion catalyst is disposed on a Zr-reinforced mullite composite honeycomb substrate.

9. A process in accordance with claim 1, wherein said second zone combustion catalyst is coated by a diffusion barrier layer comprising $\alpha$-$Al_2O_3$.

10. A process in accordance with claim 1, wherein said second zone combustion catalyst is coated by a diffusion barrier layer comprising $La_2O_3.11Al_2O_3$ hexa-aluminate.

11. A process in accordance with claim 1, wherein said second zone combustion catalyst is coated by a diffusion barrier layer comprising sintered $La_2O_3.11Al_2O_3$ hexa-aluminate.

12. A process in accordance with claim 1, wherein said combustible mixture is fully premixed and preheated to a temperature of at least about 350° C.

13. A process in accordance with claim 1 further comprising contacting any remaining partially combusted fuel from said second zone in a third zone with a third zone combustion catalyst selected from the group consisting of $La_{0.5}Sr_{0.5}MnAl_{11}O_{19}$, PdO on $La_2O_3.11Al_2O_3$ hexa-aluminate, and $La_{0.2}Sr_{0.8}MnAl_{11}O_{19}$ with Pt.

* * * * *